US011933215B2

(12) United States Patent
Redon et al.

(10) Patent No.: US 11,933,215 B2
(45) Date of Patent: Mar. 19, 2024

(54) HYDROGEN OPPOSED-PISTON ENGINE

(71) Applicant: Achates Power, Inc., San Diego, CA (US)

(72) Inventors: Fabien G. Redon, San Diego, CA (US); Ming Huo, Novi, MI (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 18/108,975

(22) Filed: Feb. 13, 2023

(65) Prior Publication Data
US 2023/0265786 A1 Aug. 24, 2023

Related U.S. Application Data

(60) Provisional application No. 63/312,248, filed on Feb. 21, 2022.

(51) Int. Cl.
| | | |
|---|---|---|
| *F02B 43/10* | (2006.01) | |
| *F02B 75/28* | (2006.01) | |
| *F02D 19/02* | (2006.01) | |
| *F02D 41/00* | (2006.01) | |

(52) U.S. Cl.
CPC .............. *F02B 43/10* (2013.01); *F02B 75/28* (2013.01); *F02D 19/021* (2013.01); *F02D 41/0027* (2013.01); *F02D 41/0047* (2013.01)

(58) Field of Classification Search
CPC ...... F02B 75/28; F02B 43/10; F02D 41/0047; F02D 19/021; F02D 41/0027
See application file for complete search history.

(56) References Cited

U.S. PATENT DOCUMENTS

| | | | |
|---|---|---|---|
| 2,440,310 A | 4/1948 | Thege | |
| 6,978,771 B2 | 12/2005 | Kuzuyama et al. | ..... F02B 47/08 |
| 7,059,114 B2 | 6/2006 | Tang et al. | ................ F01N 3/00 |
| 7,111,452 B2 | 9/2006 | Miyoshi et al. | .......... F01N 3/00 |
| 7,117,830 B1 | 10/2006 | Boyer et al. | ............... F01L 1/34 |

(Continued)

FOREIGN PATENT DOCUMENTS

| | | | |
|---|---|---|---|
| CN | 107143421 A | 9/2017 | ............. F02B 43/10 |
| DE | 202020002296 U1 | 7/2020 | ............. F02B 75/22 |

(Continued)

OTHER PUBLICATIONS

International Search Report and Written Opinion for PCT/US2022/037835, dated Nov. 28, 2022.

(Continued)

*Primary Examiner* — Kevin A Lathers
(74) *Attorney, Agent, or Firm* — Terrance A. Meador

(57) ABSTRACT

An opposed-piston engine is configured to use hydrogen fuel. The opposed-piston engine has at least one cylinder and a pair of pistons disposed for opposed motion in a bore of the cylinder. Hydrogen fuel is directly side-injected into the cylinder in a compression stroke of the opposed-piston engine, mixed with charge air in the cylinder, and auto-ignited in a combustion chamber formed in the cylinder between the pistons during the compression stroke. A method of operating the hydrogen opposed-piston engine includes switching between a first ignition mode using an externally-generated ignition impulse to ignite the mixture of hydrogen fuel and charge air, and a second ignition mode using compression to ignite the mixture.

11 Claims, 5 Drawing Sheets

(56) References Cited

U.S. PATENT DOCUMENTS

| | | | |
|---|---|---|---|
| 7,270,108 B2 | 9/2007 | Lemke | F02B 75/18 |
| 7,448,348 B2 | 11/2008 | Shinagawa et al. | F02B 13/00 |
| 7,475,668 B2 | 1/2009 | Winsor | F02B 17/00 |
| 7,487,750 B2 | 2/2009 | Leone et al. | F02B 43/00 |
| 7,740,010 B2 | 6/2010 | Fulton et al. | F02B 43/00 |
| 7,789,047 B2 | 9/2010 | Kuroki et al. | F02B 43/08 |
| 8,433,497 B2 | 4/2013 | Okada | B60T 7/12 |
| 10,415,512 B2 | 9/2019 | Kimura | F02M 25/10 |
| 10,465,616 B2 | 11/2019 | Redon et al. | F02B 3/00 |
| 2006/0236988 A1 | 10/2006 | Adler | F02G 5/00 |
| 2010/0282219 A1 | 11/2010 | Alonso | F02B 25/08 |
| 2013/0055984 A1 | 7/2013 | Snell | F02B 75/28 |
| 2016/0138499 A1 | 5/2016 | Dion et al. | F02D 41/00 |
| 2016/0195028 A1 | 7/2016 | Redon et al. | F02D 19/06 |
| 2016/0341104 A1 | 11/2016 | Redon | F02B 7/04 |
| 2016/0369686 A1 | 12/2016 | Redon | F02B 75/28 |
| 2017/0030262 A1 | 2/2017 | Venugopal | F02B 75/282 |
| 2021/0054781 A1* | 2/2021 | Nishida | F02B 63/042 |
| 2023/0025982 A1 | 1/2023 | Redon | F01B 7/14 |

FOREIGN PATENT DOCUMENTS

| | | | | |
|---|---|---|---|---|
| DE | 102019213133 A1 | 3/2021 | | F02D 19/02 |
| JP | H09 242558 A | 9/1997 | | F02B 75/28 |
| JP | 2007198275 A * | 8/2007 | | |
| JP | 2016-109111 A | 6/2016 | | F02F 1/00 |
| JP | 2021025488 | 2/2021 | | F02B 75/28 |
| WO | 2004/101972 A1 | 11/2004 | | F02B 43/10 |
| WO | 2023/004017 A1 | 1/2023 | | F01B 7/14 |
| WO | 2023/158615 A1 | 8/2023 | | F02D 75/28 |

OTHER PUBLICATIONS

Yip, Ho Long et al. A Review of Hydrogen Direct Injection for Internal Combustion Engines: Towards Carbon-Free Combustion. *Applied Sciences*. 2019, 9, 4842-4872.

Notice of Allowance dated Oct. 24, 2023 in U.S. Appl. No. 17/870,036.

International Search Report and Written Opinion for PCT/US2023/012934, dated Jun. 28, 2023.

Non-Final Office Action dated Apr. 25, 2023 in U.S. Appl. No. 17/870,036.

Amendment and Request for Reconsideration submitted dated Aug. 8, 2023 in U.S. Appl. No. 17/870,036.

* cited by examiner

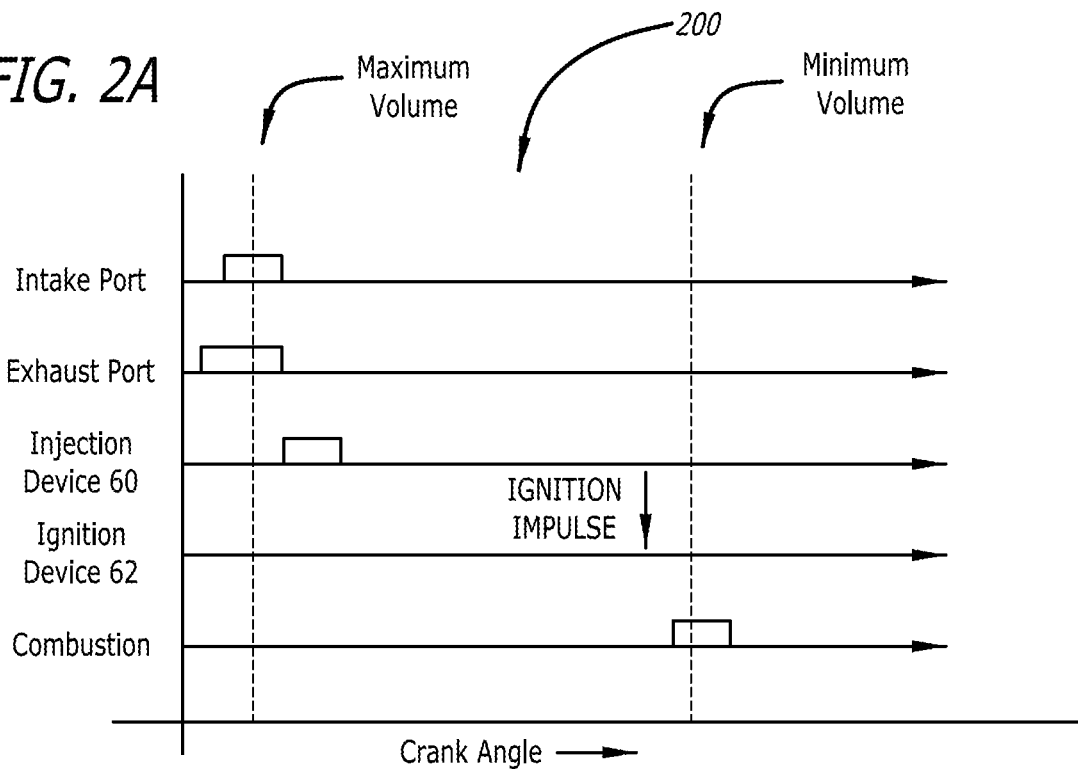
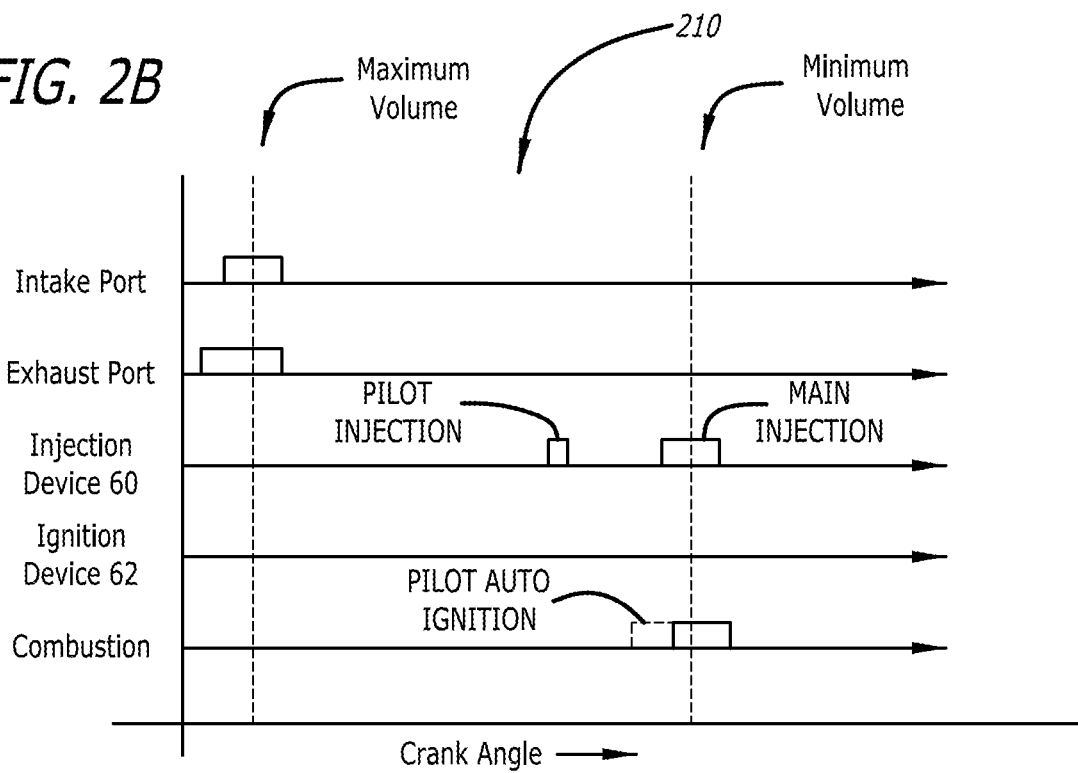

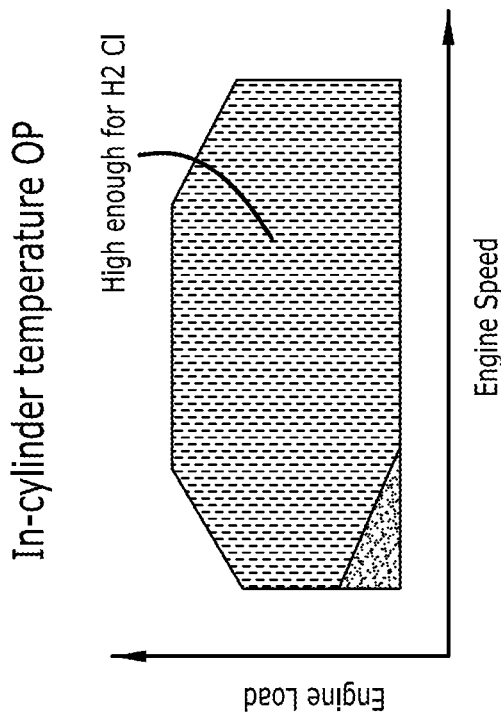
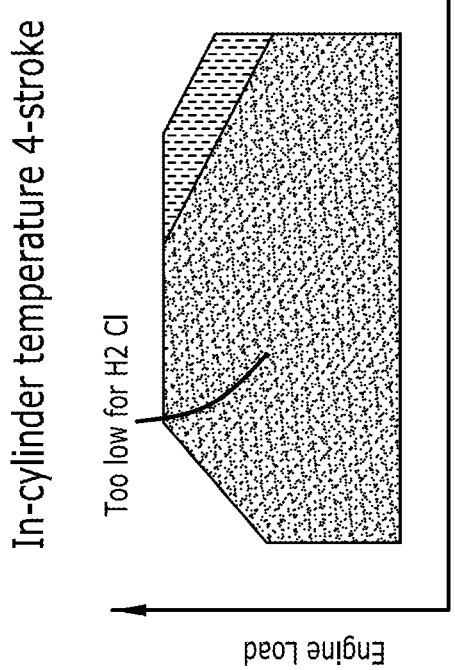
FIG. 5A
FIG. 5B

HYDROGEN OPPOSED-PISTON ENGINE

FIELD

The field includes opposed-piston internal combustion engines. More particularly, the field includes opposed-piston engines that are configured to burn hydrogen fuel.

BACKGROUND

A two-stroke cycle opposed-piston engine has benefits that allow for higher efficiency than a conventional 4-stroke engine. For example, an opposed-piston engine has a lower surface-area-to-volume ratio, which produces less heat loss than a 4-stroke engine. Further, two-stroke operation of the engine inherently reduces the mean effective cylinder pressure, thereby enabling faster combustion without excessive mechanical stress. In addition, an air handling system of an opposed-piston system affords full control of air charging by way of a pumping arrangement decoupled from the base engine operation. This type of opposed-piston engine is disclosed, for instance, by US Patent Application Publication 2016/0138499, US Patent Application Publication 2016/0369686, US Patent Application Publication 2017/0204801, and US Patent Application Publication 2017/0204790.

The above-type opposed-piston engine typically operates by combustion of diesel fuel directly injected through the side of a cylinder, into a combustion chamber where it is ignited by compression of a mixture of air and fuel. The compressed mixture reaches a temperature at which the fuel spontaneously ignites without a flame or spark. The spontaneous ignition is called "auto-ignition", and the process of compressing and igniting is called "compression ignition" (CI). Such an engine may be referred to as a direct-injection, compression-ignition (DICI) opposed-piston engine.

Diesel combustion presents challenges related to emissions, particularly by generating greenhouse gasses and producing soot. These challenges are mitigated in opposed-piston engine technology by fundamental advantages of the engine, by adaptation of exhaust after-treatment strategies, and by advances in combustion technology. Nevertheless, as effective as these solutions may become, they still add layers of technical complexity and cost to the design and development of opposed-piston engines. Alternative combustion technologies may provide simpler, less expensive solutions to emissions challenges, without surrendering the benefits of opposed-piston performance. For example, internal combustion engines have been adapted to run on natural gas and propane. However, these fuels contain carbon and produce undesirable emissions when burned, thereby requiring complex and costly mitigation. Hydrogen, however, is carbon-free if produced from renewable resources. Our critical insight has been that combustion of hydrogen under lean conditions, which are easily achieved in an opposed-piston engine operating according to a two-stroke cycle, has the potential to significantly reduce undesirable NOx emissions. Further, by using CI-initiated combustion at medium and high load points, a hydrogen opposed-piston engine may reach a level of thermal efficiency that compares favorably with that of fuel cells.

Compared with a conventional four-stroke engine, the above-type opposed-piston engine has the capability to manage higher temperatures of exhaust products trapped in preserving a pre-set amount of exhaust residuals in the cylinder. This provides the capability to auto-ignite fuels with relatively high auto-ignition temperatures through compression, which enables a higher compression ratio and higher thermal efficiency of the opposed-piston engine. In addition, the lower heat loss from the lower area-to-volume ratio of an opposed-piston engine also preserves more of the heat of a compression stroke to further increase the temperature of residuals trapped in the cylinder upon closure of both ports at the time when the mixture of fuel and air needs to be ignited. Also, two-stroke operation of an opposed-piston engine at lower brake mean effective pressure (BMEP) supports faster combustion without creating excessive mechanical stress.

To date, there have been few proposals concerning use of hydrogen fuel for an opposed-piston engine. One such proposal has been made in US provisional application for patent 63/224,721, "Hydrogen-Powered Opposed-Piston Engine, assigned in common herewith. Further, little attention has been given to optimizing hydrogen combustion in response to opposed-piston engine operating conditions.

SUMMARY

Hydrogen flame speed is higher than that of other fuels and allows for achieving faster combustion to enable higher efficiency. An opposed-piston engine with its lower BMEP requirement and lower heat losses can beneficially exploit the fast combustion of hydrogen. The invention is an opposed-piston engine configured to run on hydrogen fuel ignited in-cylinder by temperatures above a hydrogen auto-ignition temperature. At higher load conditions the in-cylinder temperatures of an opposed-piston engine are high enough for auto-ignition of hydrogen; the higher the temperature, the shorter the ignition delay. An object of the present invention is to realize these advantages by compression ignition of hydrogen fuel in an opposed-piston engine.

The invention is an opposed-piston, internal-combustion engine that operates by compression ignition of hydrogen fuel in a two-stroke cycle. The engine includes one or more ported cylinders, each provided with one or more fuel injection devices that directly inject hydrogen fuel into a combustion chamber formed near the end of the compression stroke between opposing end surfaces of a pair of pistons disposed in the cylinder.

A control unit governs operation of the engine by causing direct injection of hydrogen fuel into a cylinder during a compression stroke. In some instances, the direct injection may comprise a pilot injection of hydrogen fuel early in the compression stroke, followed by a main injection of hydrogen fuel late in the compression stroke. In this regard, the terms "pilot injection" and "main injection" are used in the usual sense to indicate injection of a small amount of hydrogen fuel ("pilot injection") before injection of a larger amount of hydrogen fuel ("main injection"). From another perspective, the pilot injection occurs before the combustion chamber reaches a minimum volume, while the main injection is initiated near the time that the combustion chamber reaches minimum volume. In any case, the pilot injection is said to lead the main injection in that it occurs earlier in the compression stroke, as may be measured for example by crank angle.

A leading pilot injection can control and minimize the amount of fuel that participates in the compression ignition of the main charge. A limited combustion caused by auto-ignition of the pilot charge ("pilot burn") can increase the in-cylinder temperature, so as to reduce the ignition delay for the main injection, which will ignite almost instantly upon injection and burn in a diffusion flame fashion while being injected. The quantity and timing of the pilot and main injections may be calibrated to achieve an optimal level of engine efficiency.

The duration of a pilot burn may last well into the main injection, or it may end before the main injection. The objective of the pilot injection is to create an in-cylinder thermal environment that best accommodates compression ignition of the main charge of hydrogen fuel.

When the engine operates at low loads or when the in-cylinder temperature is insufficient to achieve auto-ignition (as during a cold start), the engine may be operated by provision of an ignition impulse from an external source ("external ignition"). In such a case, the main charge of hydrogen fuel will be injected earlier in the compression cycle so as to have more time to distribute and be ignited by the externally-provided ignition impulse. To provide for such a case, one or more ignition devices may be positioned relative to the cylinder wall to deliver an ignition impulse into the combustion chamber, which ignites the hydrogen fuel.

BRIEF DESCRIPTION OF THE DRAWINGS

FIG. 2A is a graph illustrating the timing of injection, external ignition, and combustion of hydrogen according to a first mode of operation of the hydrogen opposed-piston engine of the invention.

FIG. 2B is a graph illustrating the timing of injection, external ignition, and combustion of hydrogen according to a second mode of operation of the hydrogen opposed-piston engine of the invention.

FIGS. 5A and 5B show in-cylinder temperature mapped for engine speed and engine load for a conventional four-stroke engine (FIG. 5A) and a two-stroke cycle opposed-piston engine (FIG. 5B).

DETAILED DESCRIPTION

The terms "hydrogen" and "hydrogen fuel" as used in this description and the claims which follow are not intended solely to denote a fuel composition consisting of pure hydrogen ($H_2$). Rather, given the currently-available, and evolving, means of generating fuel-grade hydrogen, and allowing for additives, hydrogen fuel may comprise $H_2$ and various impurities and/or additives. Accordingly, the terms "hydrogen" and "hydrogen fuel" are used interchangeably herein to mean a fuel that may comprise 100% $H_2$, or less than 100% of $H_2$; for example, hydrogen fuel may comprise from 95% to 100% of $H_2$.

A cylinder of an opposed-piston engine has ports through its sidewall for the passage of gas into and out of the bore of the cylinder. Such a cylinder is a "ported cylinder". A ported cylinder of an opposed-piston engine typically includes intake and exhaust ports cast, machined, or otherwise formed in respective exhaust and intake portions of its sidewall. Ported cylinders can be constituted as elements of a parent bore engine structure, or as liners (sometimes called "sleeves") received in an engine block to form cylinders.

One or more fuel injectors are situated between the intake and exhaust ports for directly injecting one or more jets of hydrogen fuel through the sidewall, into the cylinder, along a trajectory that crosses the longitudinal axis of the cylinder ("direct side injection").

Figure 1:
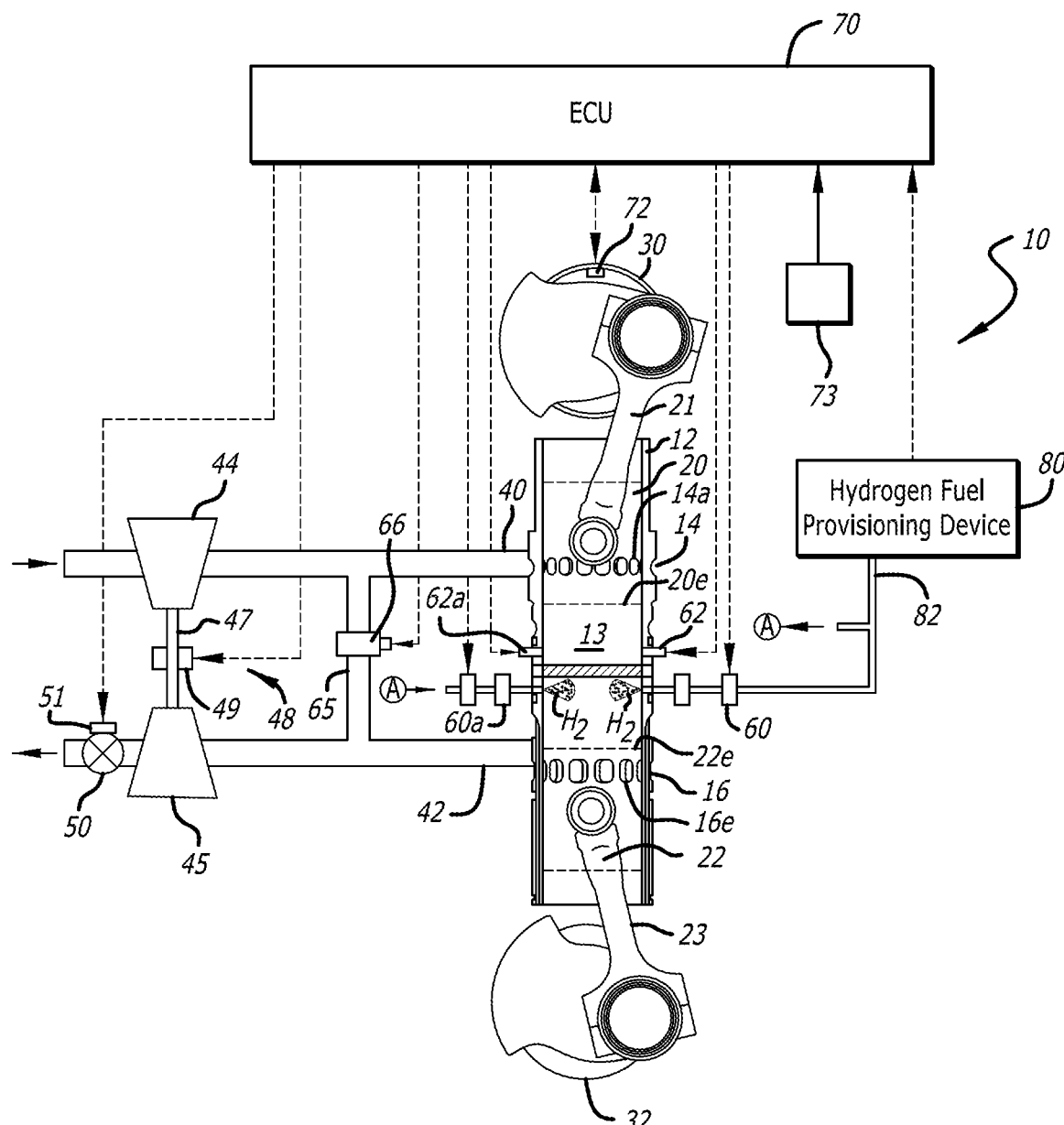
FIG. 1 is a schematic diagram which illustrates a preferred embodiment of the hydrogen opposed-piston engine of the invention.

An embodiment of the hydrogen-fueled opposed-piston engine according to the invention is shown in FIG. 1. The preferred embodiment comprises a two-stroke-cycle uniflow-scavenged opposed-piston engine 10, which is configured to combust hydrogen fuel. The engine 10 comprises a ported cylinder 12 with a bore 13 and two ports for the passage of gas. For example, the opposed-piston 10 may comprise one ported cylinder, two ported cylinders, or three or more ported cylinders. The ported cylinder 12 receives air through an intake port 14 formed in an intake portion including one end of the cylinder and discharges exhaust gas through an exhaust port 16 formed in an exhaust portion including the opposite end of the cylinder. The intake port 14 comprises a circumferential array of port openings 14$i$ in the intake portion of the cylinder 12. The intake port openings 14$i$ may be conventionally shaped to cause air entering the cylinder to swirl in the bore. The exhaust port 16 comprises a circumferential array of port openings 16$e$ in the exhaust portion of the cylinder 12. The exhaust port openings 16$e$ may be conventionally dimensioned and located to provide a blowdown time of sufficient length to initiate purging of exhaust gas from the cylinder before the intake port opens.

As illustrated in FIG. 1, the opposed-piston engine 10 includes first and second pistons 20, 22, which are disposed for mutually opposing movements in the bore 13 with their end surfaces 20$e$, 22$e$ facing each other. The pistons 20, 22 are oriented in this way so as to be able to reciprocate in opposition along a longitudinal axis of the cylinder bore 13. For convenience, the first piston 20 may be referred as the "intake" piston because of its proximity to the intake port 14. Similarly, the second piston 22 may be referred as the "exhaust" piston because of its proximity to the exhaust port 16. The intake port 14 is opened and closed in response to back-and-forth movement of the intake piston 20 as it traverses the bore between its top center (TC) and bottom center (BC) locations. The exhaust port 16 is opened and closed in response to back-and-forth movement of the exhaust piston 22 as it traverses the bore between its top center (TC) and bottom center (BC) locations.

The pistons of an opposed-piston engine are connected to at least one crankshaft. In some cases, the pistons are coupled by rocker arm linkages to a single crankshaft. Preferably, as per FIG. 1, the hydrogen-fueled opposed-piston engine 10 comprises two crankshafts 30 and 32, with the intake piston 20 coupled by a connecting linkage 21 to the crankshaft 30 and the exhaust piston 22 coupled by a connecting linkage 23 to the crankshaft 32. In many cases, the crankshafts are coupled by a gear train or equivalent means so as to rotate together in synchronism. In some other cases, the crankshafts may be mechanically uncoupled, but have their rotations synchronized by other means.

Operation of the hydrogen opposed-piston engine 10 is based on a two-stroke cycle, in which the engine completes a cycle of operation with a single complete rotation of a crankshaft and two strokes of a piston connected to the crankshaft. The two strokes are denoted as an expansion stroke and a compression stroke. Each of the opposed pistons 20, 22 moves between a respective BC (bottom center) location in the cylinder 12 where it is nearest one end of the cylinder, and a respective TC (top center) location within the cylinder where it is furthest from the one end. During an expansion stroke, the pistons are driven away from their TC locations toward their BC locations by combustion of fuel between their end surfaces. During a compression stroke, the pistons are pushed away from their BC locations toward their TC regions by rotation of the crankshafts to which they are attached. The intake and exhaust ports 14, 16 are located near the respective BC locations of the intake and exhaust pistons. Each of the opposed pistons 20, 22 controls a respective one of the ports 14, 16, opening the port as it approaches its BC location, and closing the port as it moves away from its BC location.

There may be a phase offset between the rotations of the crankshafts 30 and 32. For example, the crankshaft 32 may lead the crankshaft 30. Such a phase offset causes the movement of the exhaust piston 22 to lead the movement of the intake piston 20 during each two-stroke cycle of the engine. Consequently, near the end of an expansion stroke, movement of exhaust piston 22 opens the exhaust port 16 before movement of the intake piston 20 opens the intake port 14. This causes exhaust gas to begin to flow out of the cylinder 12 before air begins to flow into the cylinder 12. This initial discharge of exhaust gas is referred to as "blowdown." For a short time, following blowdown, both ports are open, and air enters the intake port 14 at an intake pressure that is higher than an exhaust pressure felt at the exhaust port 16. This pressure differential causes the exhaust gas to continue flowing out of the exhaust port. This displacement of exhaust gas by air is referred to as "scavenging", or "gas exchange." Gas flows through the cylinder in a single direction ("uniflow")—from intake port to exhaust port—and the displacement of exhaust gas by air in this manner is referred to as "uniflow scavenging". Shortly after the beginning of a compression stroke, the intake port 14 and the exhaust port 16 close, causing air to be trapped in the ported cylinder 12 for the remainder of the compression stroke.

As the pistons 20, 22 move together and apart during a cycle of engine operation, a maximum volume and a minimum volume occur between their end surfaces. The maximum volume is defined as cylinder volume contained between the piston end surfaces 20e, 22e as the pistons move (simultaneously or sequentially) from BC, which occurs when the pistons are furthest apart. The minimum volume is defined as cylinder volume contained between the end surfaces 20e, 22e when the pistons are closest together. A representative minimum volume zone of the bore 13 is represented by shading in FIG. 1.

As per FIG. 1, the engine 10 is provided with an intake channel 40 that conveys charge air to the intake port 14 and an exhaust channel 42 that receives exhaust gas discharged through the exhaust port 16. A compressor 44 is positioned in the intake channel 40, upstream of the intake port 14, and a turbine 45 is positioned in the exhaust channel 42, downstream of the exhaust port 16. The compressor 44 and turbine 45 are mechanically coupled by a rotatable shaft 47. Together, the compressor 44, turbine 45, and rotatable shaft 47 form a turbocharger device 48. The turbocharger device 48 operates in response to exhaust gas flowing from the exhaust port 16, through the exhaust channel 42, which causes the turbine 45 to rotate, thereby rotating the compressor 44 via the rotatable shaft 47. When the compressor 44 rotates, atmospheric air flowing into the compressor 44 is pressurized and provided to the intake channel 40. The pressurized air flowing in the intake channel 40 to the intake port 14 is referred to as "charge air"; in some cases, charge air may comprise a portion of exhaust gas produced by the engine. A preferred turbocharger device 48 for the hydrogen-fueled opposed-piston engine is an assisted turbocharger in which an assist device 49 coupled to the rotatable shaft 47 provides power to the rotatable shaft 47. The assist device causes the turbocharger device 48 to boost provision of charge air in response to torque demands and accelerates the response of the turbine. The assist device 49 may comprise any turbocharger assist mechanism. For example, power may be provided to the rotatable shaft 47 by way of an electric motor, a hydraulic motor, a clutched, multispeed device coupled to a crankshaft, and so on.

The amount of charge air provided to the cylinder for scavenging and combustion is adjusted by varying the amount of power coupled to the turbocharger device 48 by the assist device 49. Variation of the power provided by the assist device 49 varies the speed of the compressor 44, which varies the mass flow of charge air provided through the intake channel 40, to the intake port 14. The pressure of the mass flow of charge air into the intake port 14 is referred to as "intake pressure". Mass flow of exhaust gas that exits the ported cylinder 12 through the exhaust channel 42 may be controlled by varying the degree of opening of an exhaust backpressure valve 50, which is positioned in the exhaust channel 42, downstream of an outlet of the turbine 45. The exhaust backpressure valve 50 is opened and closed by an exhaust valve actuator 51.

As shown in FIG. 1, at least one fuel injection device 60 is supported at, or mounted to, a sidewall of the ported cylinder 12 and configured to inject hydrogen fuel directly into the ported cylinder 12, in a radial direction of the cylinder, between the end surfaces 20e and 22e. The number of fuel injection devices provided for injection of hydrogen fuel in the opposed-piston engine of the invention is a matter of design choice, which may call for one, two, or three or more fuel injection devices. At least one ignition device 62, external to the ported cylinder, is supported at or mounted to a wall of the ported cylinder 12 to deliver an ignition impulse into a combustion chamber defined in the cylinder bore 13 between the end surfaces 20e, 22e of the pistons. The ignition impulse ignites a mixture of charge air and hydrogen fuel in the combustion chamber. The number of ignition devices provided for igniting a mixture of charge air and hydrogen fuel in the opposed-piston engine of the invention is a matter of design choice, which may call for one, two, or three or more ignition devices. In the example shown in FIG. 1, a second fuel injection device 60a and/or a second ignition device 62b are provided. A fuel injection device may comprise hydrogen injector or a poppet valve. An ignition device may comprise an electrical or electronic device such as spark plug, a laser, or a glow plug.

An electronic engine control unit (ECU) 70 controls the operations of the assist device 49, the exhaust valve actuator 51, the fuel injector device 60, and the ignition device 62. The ECU 70 comprises a programmable device programmed to execute fuel delivery algorithms, air and exhaust control algorithms, and ignition algorithms under various engine operating conditions. Such algorithms are embodied in control modules and maps that are part of an engine systems control program executed by the ECU 70 while the hydrogen-fueled opposed-piston engine is operating. The ECU is programmed to determine a total charge air mass and a total hydrogen fuel mass required to meet a current engine condition (i.e., cold start, restart, idle, accelerate, decelerate). The ECU 70 controls the assist device 49 to adjust the speed of the compressor 44, thereby to achieve the determined total charge air amount. The ECU 70 controls an injection pattern and duration of the one or more fuel injectors 60 to obtain the required amount of hydrogen fuel. The charge air and hydrogen fuel amounts may be constrained by the ECU 70 to maintain a charge air/hydrogen fuel balance within a specified lambda (λ) range that ensures an optimal mixture of air and hydrogen fuel under most engine operating conditions.

The ECU 70 is electrically connected to a crankshaft position sensor, which provides a signal indicating a rotational angle of one of the crankshafts 30, 32 of the hydrogen-fueled opposed-piston engine 10. For example, as shown in FIG. 1, the ECU 70 receives from a crankshaft position sensor 72 a signal representing the rotational angle of the crankshaft 30. Other sensors electrically connected to the ECU 70 may be used to detect various engine operating parameters. For example, an exhaust temperature sensor 73 may be provided, with which an in-cylinder temperature may be determined by calculation or calibration. With the rotational angle, and other parameter values, the ECU 70 can calculate engine speed, track the operational cycle of the engine, and execute injection and ignition operations by controlling the at least one fuel injector 60 and the at least one ignition device 62. For example, the ECU 70 controls the fuel injectors 60 and 60a and the ignition devices 62, 62a.

The hydrogen-fueled opposed-piston engine 10 may be provided with a means that functions to manage the constituents of the charge retained (trapped) in a cylinder by closure of both ports. In these cases, the ECU 70 is further configured to control the trapped temperature of the cylinder, which is the average charge/gas temperature inside the cylinder when the ports are closed. According to an exhaust gas retention method, exhaust gas that might otherwise be purged during scavenging is retained in the cylinder 12. The ECU 70 determines, from engine operating conditions, an amount of exhaust gas to be retained and controls the assist device 49 to reduce the speed of the turbocharger and/or operates the backpressure valve actuator 51 to adjust the position of the backpressure valve 50 to achieve the determined amount.

The hydrogen-fueled opposed-piston engine may comprise a means for diluting the mixture of charge air and injected hydrogen fuel which is constituted as an exhaust gas recirculation channel. According to an exhaust gas recirculation (EGR) method, exhaust gas may be transported from the exhaust channel to be mixed with charge air delivered to the intake port of the cylinder. If EGR is provided, the precise EGR configuration is a matter of design choice. The EGR configuration may comprise a low-pressure EGR device, a high-pressure EGR device, or a hybrid EGR device. FIG. 1 illustrates a preferred EGR device embodiment comprising a high-pressure EGR channel 65, which recirculates an adjustable portion of exhaust gas from the exhaust channel 42 to be mixed with charge air in the intake channel 40. An EGR pump 66 is positioned in the high-pressure EGR channel 65 to adjust the amount of exhaust gas which is recirculated. The ECU 70 determines, from engine operating conditions an amount of exhaust gas to be recirculated and controls the EGR pump 66 to obtain the determined amount.

The hydrogen-fueled opposed-piston engine 10 uses hydrogen as fuel. Means and methods for supplying this type of fuel to a combustion chamber formed between the end surfaces 2oe, 22e in the bore 13 are shown in FIG. 1 and will be described in detail. The above-mentioned at least one fuel injection device 60 is used to inject hydrogen fuel directly into the bore 13 of the ported cylinder 12 through a sidewall of the ported cylinder 12. Hydrogen fuel is provided to the one or more fuel injection devices 60 from a hydrogen fuel provisioning device 80 through a fuel channel 82. The hydrogen fuel provisioning device 80 is constructed to provide hydrogen fuel at high pressures, for example up to 700 bar or more. The provisioning device 80 may include a fuel pressure regulator in communication with the fuel tank to deliver compressed hydrogen gas to the at least one fuel injection device 60 in a range of regulated pressure that is well above the interior pressure of a ported cylinder during a compression stroke. It may be useful to provide a device to pump hydrogen fuel to the one or more injectors 60.

FIG. 2A includes a graph 200 showing an external ignition mode ("SI mode") of engine operation. The graph 200 illustrates how the ECU 70 controls the timing of: injection by the at least one fuel injection device 60; external ignition of hydrogen fuel by the at least one ignition device 62; and combustion of hydrogen fuel with respect to operations of the intake and exhaust ports of the hydrogen opposed-piston engine of the invention. The horizontal axis of this graph represents the crank angle (CA) in degrees of rotation of the crankshaft 30 as detected by the sensing device 72. In the case where the crankshaft 32 leads the crankshaft 30 by a specified crank angle, movement of the exhaust piston 22 to BC near the end of an expansion stroke leads movement of the intake piston 20 to BC which causes the exhaust port 16 to open before the intake port 14. The ECU 70 initiates fuel injection by the at least one fuel injection device 60 during the compression stroke of a cycle of engine operation, at a time when the gas exchange process is completed or nears completion, which occurs early in the compression stroke when, or soon after the intake and exhaust ports 14, 16 are both closed. For timing purposes, closure of one of the ports may be designated as indicating closure of both ports. Presuming that closure of the intake port 14 signals closure of both ports, following maximum volume, the interior pressure of the cylinder is low, and the ECU 70 causes fuel to be directly injected by the one or more fuel injectors at or soon after both ports are closed. The injected hydrogen fuel mixes with the trapped charge air as the compression stroke continues. Near the end of the compression stroke, the hydrogen fuel is well-mixed with the charge air and the ECU causes the air/fuel mixture to be ignited by initiating an ignition impulse produced by the at least one ignition device 62. For example, the ignition device 62 may be controlled by the ECU 70 to produce an ignition impulse just before minimum volume for a combustion phasing corresponding to about 2-4 degrees CA after minimum volume for a 50% mass fraction burned for optimal efficiency.

The injection/ignition/combustion example illustrated in FIG. 2A can be adapted to particular applications of the hydrogen opposed-piston engine. Injection need not be limited to start just at port closure; for example, it could start just before port closure if the at least one injector device 62 is positioned in or on the cylinder sidewall near the shaded minimum zone of the bore 13 seen FIG. 1. This position would provide a distance to each port sufficient to guarantee that both ports will be closed before the injected hydrogen fuel reaches them. Thus, in the broadest sense, the ECU 70 may be programmed to base injection of hydrogen fuel on closure of a port, under the condition that it may cause injection to occur shortly before, at the time of, or shortly after closure of the port. Duration of injection is a design choice. It depends on a current speed-load point of engine operation, injection pressure, the number and flow capacity of injection devices, and cylinder pressure. A sample case for rated power on a heavy-duty vehicle application would be 60 CA degrees of duration.

FIG. 2B includes a graph 210 that illustrates a compression-ignition mode ("CI") of engine operation. The graph 210 illustrates how the ECU 70 controls: the timing of injection of hydrogen by the at least one fuel injection device 60; auto-ignition of injected hydrogen; and combustion of hydrogen with respect to operations of the intake and exhaust ports of the hydrogen opposed-piston engine of the invention. The horizontal axis of the graph 210 represents the crank angle (CA) in degrees of rotation of the crankshaft 30 as detected by the sensing device 72. In the case where the crankshaft 32 leads the crankshaft 30 by a specified crank angle, movement of the piston 22 to BC leads movement of the piston 20 to BC which causes the exhaust port 16 to open before the intake port 14. The ECU 70 causes fuel to be injected by the at least one fuel injection device 60 during the compression stroke of a cycle of engine operation, after the gas exchange process is completed, which occurs at or during maximum volume, or soon after the time when the intake and exhaust ports 14, 16 are both closed. During the compression stroke, before the in-cylinder temperature reaches the auto-ignition temperature of the hydrogen fuel, the ECU 70 initiates a pilot injection ("Pilot") of the hydrogen fuel by the one or more injector devices 60. As the compression stroke continues, the injected pilot mass is mixed with the charge air, typically by swirl generated by the intake port. The air/pilot-fuel mixture self-ignites when the cylinder temperature reaches the auto-ignition level. Near or during minimum volume, the ECU 70 initiates a main injection ("Main") of hydrogen fuel by the one or more injector devices 60, which results in nearly immediate ignition. Use of a pilot injection injected earlier during the compression stroke, after port closure, can control and minimize the amount of fuel that participates in the auto-ignition. The small combustion of the pilot injection increases the in-cylinder temperature to further reduce the ignition delay for the main injection that will ignite almost instantly and burn in a diffusion flame fashion while it is injected. The quantity and timing of both injections may be calibrated to achieve the optimal efficiency. The compression-ignition mode requires hydrogen injection pressures sufficient to inject the fuel with enough time to form an air-fuel mixture that will self-ignite and achieve fast combustion.

Figure 3:
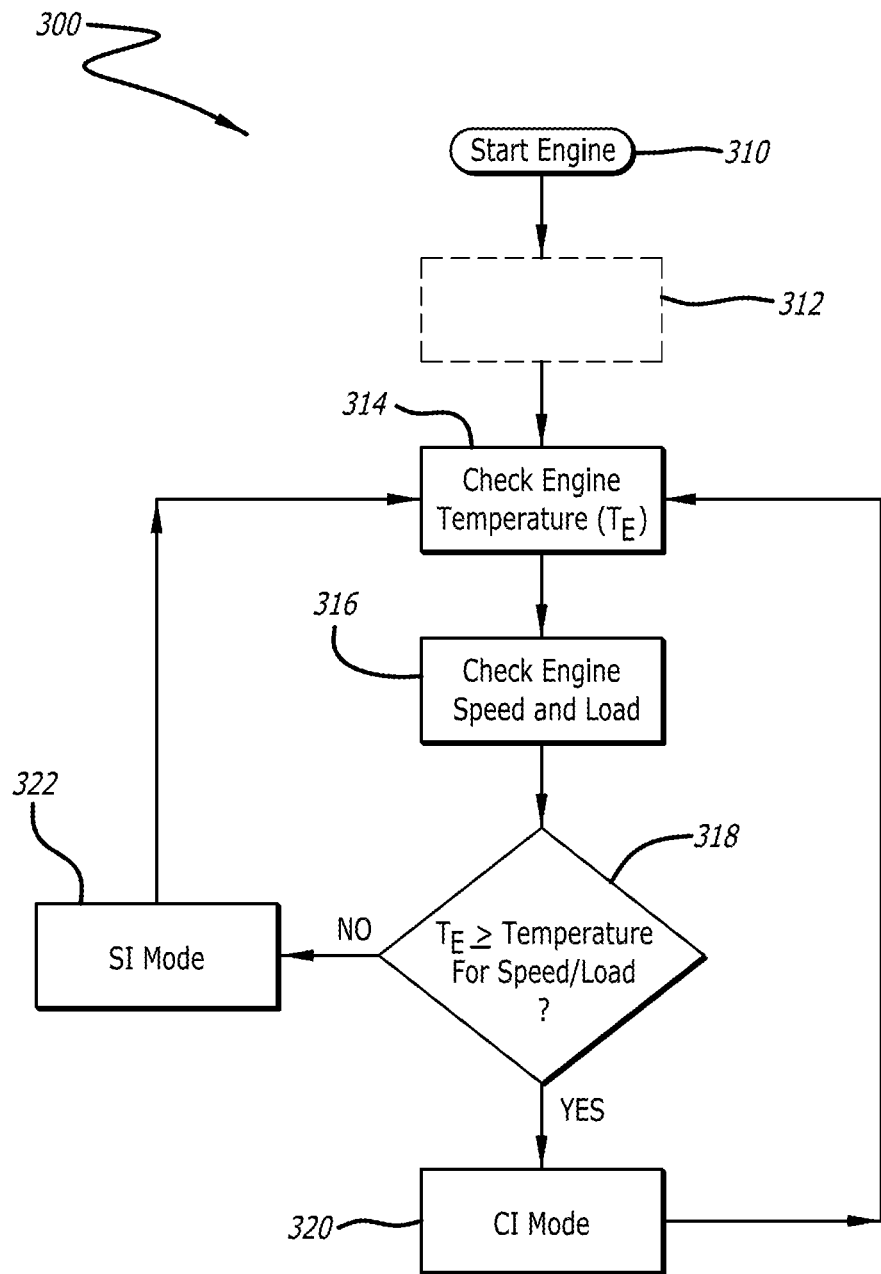
FIG. 3 is a flow chart illustrating an algorithm for controlling the hydrogen opposed-piston engine of the invention.

A method of operating the hydrogen opposed-piston engine in a dual-mode fashion by selectively switching between an external-ignition mode of engine operation such as in FIG. 2A and a compression-ignition mode of engine operation such as in FIG. 2B is illustrated in FIG. 3. Switching between these modes may be controlled according to the magnitude of an indicated engine load and in-cylinder temperature. In this regard, under the condition of a high indicated load and an in-cylinder temperature insufficient to support compression ignition of the hydrogen fuel at the indicated load, the injection and ignition devices are controlled to enable an external-ignition mode of engine operation. Conversely, under the condition of a low indicated load and an in-cylinder temperature sufficient to support compression ignition of the hydrogen fuel at the indicated load, the injection devices are controlled to enable a compression-ignition mode of engine operation. Given the anticipated difficulty of directly measuring in-cylinder temperature, an indicant such as exhaust manifold temperature may be a useful representative of in-cylinder temperature.

The method of FIG. 3 is executed by the ECU 70, which determines the operating state of the hydrogen opposed-piston engine and controls the one or more injection devices 60 and the one or more ignition devices 62 so as to operate the engine in an external-ignition mode (SI) as illustrated in FIG. 2A, or in a compression-ignition mode (CI) as illustrated in FIG. 2B, and to switch therebetween in response to engine operating conditions. The ECU 70 operates the engine according to an algorithm 300. First, the engine is started in step 310. As the start step 310 proceeds, the engine warms, and the ECU 70 transitions the engine to a predetermined initial running state 312, which, preferably, includes operating the engine in an SI mode per FIG. 2A. From step 312, the ECU 70 checks engine temperature (TE) in step 314 and checks indicated engine speed and load in step 316. In step 318, the ECU 70 compares TE with a calibrated engine temperature value (Tc) corresponding to the indicated engine speed and load. If TE equals or exceeds Tc for the indicated speed and load, the ECU 70 operates the engine in a CI mode (per FIG. 2B) in step 320. If TE is less than Tc for the indicated speed and load, the ECU 70 operates the engine in the SI mode (per FIG. 2A) in step 322. From step 320 or step 322, the ECU proceeds to step 314. Thus, once the engine is started, the ECU 70 loops continuously through steps 314, 316, 318, and 320 or 322 until engine operation ceases.

Figure 4:
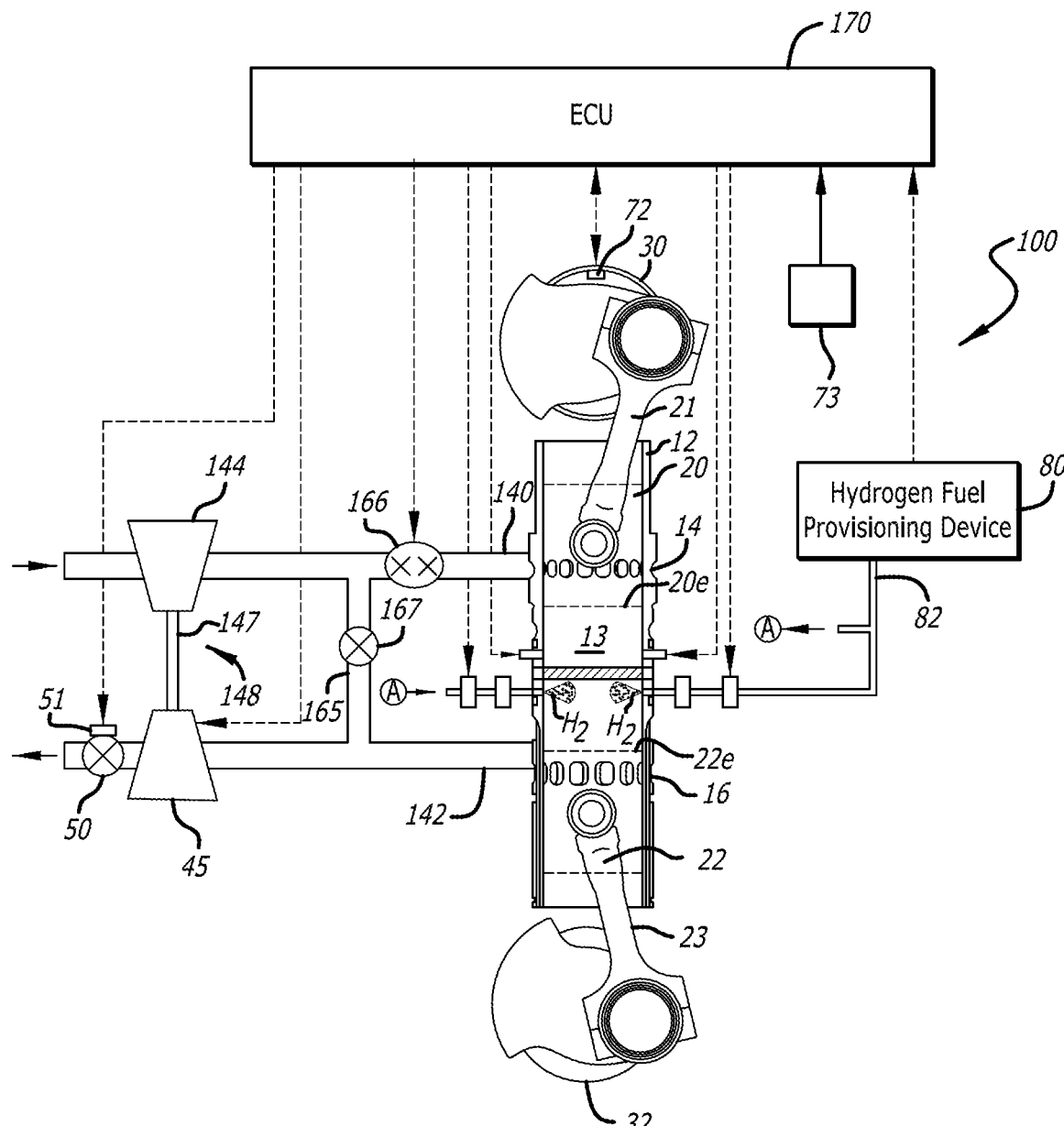
FIG. 4 is a schematic diagram which illustrates a second embodiment of the hydrogen opposed-piston engine of the invention.

A second embodiment of the hydrogen opposed-piston engine according to the invention is shown in FIG. 4. The second embodiment comprises a two-stroke-cycle uniflow scavenged opposed-piston engine 100, which is configured to combust hydrogen fuel. The hydrogen-fueled opposed-piston engine 100 corresponds essentially to the first embodiment hydrogen-fueled engine 10 in almost all respects, differing only in the manner in which charge air and exhaust gas are adjustably controlled.

As seen in FIG. 4, the ported cylinder 12 is provided with an intake channel 140 that conveys air to the intake port 14 and an exhaust channel 142 that conveys exhaust gas discharged through the exhaust port 16. A compressor 144 is positioned in the intake channel 140, upstream of the intake port 14, and a turbine 145 is positioned in the exhaust channel 142, downstream of the exhaust port 16. The compressor 144 and turbine 145 are mechanically coupled by a rotatable shaft 147. Together, the compressor 144, turbine 145, and rotatable shaft 147 form a turbocharger device 148, in which exhaust gas flowing from the exhaust port 16, through the exhaust channel 142, causes the turbine 145 to rotate, thereby rotating the compressor 144 via the rotatable shaft 147. When the compressor 144 rotates, atmospheric air flowing into the compressor 144 is pressurized and provided to the intake channel 142. The pressurized air flowing through the intake channel 142 is referred to as "charge air"; in some cases, charge air may comprise a portion of exhaust gas produced by the engine. A preferred turbocharger device 148 for the hydrogen-fueled opposed-piston engine 100 may comprise an adjustable turbine 145 with one or more integral devices which are actuated to vary a pressure across the turbine 145, thereby enabling a degree of control of the speed and the response of the turbocharger. Such turbine pressure control devices include variable geometry vanes and walls. Another adjustable turbine configuration may include a wastegate which is actuated to control the flow of exhaust gas to the turbine 144, which regulates rotational speed of the compressor. An adjustable supercharger device 166 is positioned in the air channel 140, downstream of the compressor 144, and upstream of the intake port 14. A preferred configuration of the adjustable supercharger device 166 may comprise an adjustable drive device which is actuated to vary the speed of the supercharger device, thereby enabling a degree of control of the speed and the response of the supercharger device. The adjustable supercharger device 166 may also include a bypass valve which is actuated to control flow of charge air through the supercharger device, which enables control of pressure across the hydrogen-fueled opposed-piston 100, control of boost in response to torque demands, and control of pressure to pump EGR to the intake port 14.

The amount of charge air provided to the ported cylinder 12 for scavenging and combustion is adjusted by regulation of the adjustable turbine 145 and the adjustable supercharger 166. Variation of the speed of the adjustable turbine 145 varies the speed of the compressor 144, which varies the mass flow of charge air provided to the supercharger 166. Variation of the speed of the adjustable supercharger 166 adjusts the mass flow of charge air through the intake channel 140, into the intake port 14. The pressure of the mass flow of charge air into the intake port 14 is referred to as "intake pressure".

An electronic engine control unit (ECU) 170 controls the operations of the adjustable turbocharger, the adjustable supercharger 166, the exhaust valve actuator 51, the fuel injector device 60, and the ignition device 62. The ECU 170 comprises a programmable device programmed to execute fuel delivery algorithms, air and exhaust adjustment algorithms, and ignition algorithms under various engine operating conditions. Such algorithms are embodied in control modules and maps that are part of an engine systems control program executed by the ECU 170 while the hydrogen-fueled opposed-piston engine is operating. The ECU 170 is programmed to determine a total charge air mass and a total hydrogen fuel mass required to meet a current engine condition (i.e., cold start, restart, idle, accelerate, decelerate). The ECU 170 controls the adjustable turbine 145 to adjust the speed of the compressor 144, thereby to provide a mass flow of charge air to the adjustable supercharger 166. The ECU 170 controls the adjustable supercharger 166 to thereby achieve the determined total charge air amount. The ECU 170 controls an injection pattern and duration of the one or more fuel injectors 60 to obtain the required amount of hydrogen fuel. The charge air and hydrogen fuel amounts are constrained by the ECU 170 to maintain a charge air/hydrogen fuel balance within a specified lambda ($\lambda$) range, which ensures a desirably lean mixture of air and hydrogen fuel under most engine operating conditions. The ECU 170 operates the engine 100 according to a method illustrated by FIG. 3.

As should be evident with reference to this specification, a significant advantage obtainable by a hydrogen opposed-piston engine according to the invention is shown in FIGS. 5A and 5B. Each figure shows in-cylinder temperature mapped for engine speed and engine load. With reference to FIG. 5A, a conventional four-stroke engine typically expels all of the hot combustion gases of the cylinder and inducts a fresh, cool air (or, air+EGR) charge on the intake stroke. This process makes it difficult to control trapped temperatures required for auto-ignition of hydrogen since there is minimal hot internal residual unless complex air handling equipment is used on conventional engines. One potential method for enhancing trapped temperature in a conventional four stroke engine is to introduce large amount of uncooled EGR. However, this will significantly reduce the engine's volumetric efficiency. Consequently, as seen in FIG. 5A, in-cylinder temperature of a conventional four-stroke engine is rarely high enough for compression ignition of hydrogen (indicates as $H_2$ CI). Therefore, conventional engines typically cannot efficiently use compression ignition for a hard-to-auto-ignite fuel like hydrogen since the trapped temperatures are too low. Conventional engines which burn hydrogen must use a spark plug or prechamber or dual-fuel solution over almost all of the operating range, adding cost and complexity, or having implications on maximum efficiency of the engine. As seen in FIG. 5B an opposed-piston engine according to the invention is capable of controlling scavenging over a wide range of engine operation, and is thereby enabled to control the trapped temperature of the cylinder. This enables the use of hard-to-auto-ignite hydrogen as fuel since the opposed-piston engine can be operated in a manner to target trapped conditions. Consequently, for an opposed-piston engine, the majority of the map of FIG. 5A is $H_2$ CI enabled. In contrast, as the four-stroke map of FIG. 5A shows, most of the operation range is of the conventional four-stroke engine is too low for hydrogen compression-ignition, with only a small portion having the appropriate trapped conditions (at very high loads) for compression ignition of hydrogen.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An opposed-piston engine, comprising:
   at least one ported cylinder with a bore;
   a pair of pistons disposed for mutually opposing movements in the bore;
   an intake channel for providing a flow of charge air through an intake port of the cylinder;
   an exhaust channel for receiving a flow of exhaust gas through an exhaust port of the cylinder;
   a hydrogen fuel provisioning device configured to provide hydrogen fuel;
   at least one fuel injection device coupled to the hydrogen fuel provisioning device and configured to inject the provided hydrogen fuel directly into the cylinder bore; and,
   at least one ignition device configured to ignite a mixture of charge air and injected hydrogen fuel in a combustion chamber formed in the bore between end surfaces of the pair of pistons; and,
   a control unit coupled to the at least one fuel injection device and to the at least one ignition device and configured to:
   initiate injection of the provided hydrogen fuel in response to closure of a designated one of the intake port and the exhaust port;
   initiate ignition of the mixture of charge air and injected hydrogen fuel using the at least one ignition device according to an external-ignition mode of operation of the opposed-piston engine; and,
   initiate a pilot injection of hydrogen fuel, and initiate injection of a main charge of hydrogen fuel following the pilot injection of the hydrogen fuel, whereby, the pilot injection and the main injection auto-ignite in response to compression of the charge air according to a compression-ignition mode of engine operation.

2. The opposed-piston engine of claim 1, wherein the control unit is further configured to selectively switch between the external-ignition mode of engine operation and the compression-ignition mode of engine operation, based upon a temperature of the cylinder.

3. The opposed-piston engine of claim 1, wherein the at least one ignition device comprises a spark plug positioned to ignite the mixture of charge air and injected hydrogen fuel in the combustion chamber.

4. The opposed-piston engine of claim 1, wherein the control unit is configured to cause the at least one fuel injection device to inject the provided hydrogen fuel based on closure of the intake port by the first piston.

5. The opposed-piston engine of claim 1, further including means for diluting the mixture of charge air and injected hydrogen fuel.

6. The opposed-piston engine of claim 5, wherein the means for diluting the mixture comprises comprises a low-pressure EGR device, a high-pressure EGR device, or a hybrid EGR device.

7. An opposed-piston engine, comprising:
at least one ported cylinder with a bore;
a pair of pistons disposed for mutually opposing movements in the bore;
an air channel configured to provide a flow of charge air through an intake port of the cylinder in response to movement of a first piston of the pair of pistons past the intake port;
an exhaust channel configured to receive a flow of exhaust gas through an exhaust port of the cylinder in response to movement of a second piston of the pair of pistons past the exhaust port;
a fuel provisioning device configured to provide hydrogen fuel;
at least one fuel injection device coupled to the fuel provisioning device and configured to inject the provided hydrogen fuel directly into the cylinder bore to be mixed with the charge air;
at least one ignition device configured to ignite the mixture of charge air and injected hydrogen fuel in a combustion chamber formed in the bore between end surfaces of the pair of pistons; and,
a control unit coupled to the at least one fuel injection device and the means for adjusting charge air, which is configured to:
cause external ignition of the mixture of hydrogen fuel and charge air using the at least one ignition device to generate an ignition impulse in the bore; and,
cause compression ignition of the mixture of hydrogen fuel and charge air using the at least one fuel injection device to inject a pilot charge of hydrogen fuel followed by a main charge of hydrogen fuel; and,
selectively switch between a first mode of engine operation using external ignition and a second mode of engine operation using compression ignition, based upon a temperature of the cylinder.

8. The opposed-piston engine of claim 7, wherein the exhaust channel comprises an assisted turbocharger with a turbine positioned in the exhaust channel and a compressor positioned in the air channel.

9. The opposed-piston engine of claim 7, further comprising means for diluting the mixture of charge air and injected hydrogen fuel.

10. The opposed-piston engine of claim 7, wherein the at least one ignition device comprises at least one spark plug positioned to ignite the mixture of charge air and injected hydrogen fuel in the combustion chamber.

11. A method for operating an opposed-piston engine, comprising the steps of:
providing a flow of charge air into a combustion chamber formed in a cylinder of the engine;
directly injecting hydrogen fuel into the combustion chamber;
forming a mixture of injected hydrogen fuel and charge air in the combustion chamber;
igniting the mixture of injected hydrogen fuel and charge air by an externally-generated ignition impulse; and,
auto-igniting the mixture of injected hydrogen fuel and charge air by compressing the mixture; and
selectively switching between a first mode of engine operation using the externally-generated ignition impulse and a second mode of engine operation using auto-ignited compression ignition of the mixture, based upon a trapped temperature of the cylinder.

* * * * *